US007152675B2

(12) United States Patent
Heard

(10) Patent No.: US 7,152,675 B2
(45) Date of Patent: Dec. 26, 2006

(54) SUBTERRANEAN HYDROGEN STORAGE PROCESS

(75) Inventor: William C. Heard, Odessa, TX (US)

(73) Assignee: The Curators of the University of Missouri, Columbia, MO (US)

( * ) Notice: Subject to any disclaimer, the term of this patent is extended or adjusted under 35 U.S.C. 154(b) by 380 days.

(21) Appl. No.: 10/723,465

(22) Filed: Nov. 26, 2003

(65) Prior Publication Data

US 2005/0109504 A1    May 26, 2005

(51) Int. Cl.
*E21B 43/12*    (2006.01)
*E21B 43/25*    (2006.01)
*E21B 43/30*    (2006.01)

(52) U.S. Cl. .................. 166/245; 166/263; 166/305.1; 166/308.1; 166/370; 405/53; 405/57

(58) Field of Classification Search ..................... None
See application file for complete search history.

(56) References Cited

U.S. PATENT DOCUMENTS

| | | | | |
|---|---|---|---|---|
| 4,114,688 A | * | 9/1978 | Terry .......................... 166/246 |
| 4,135,578 A | * | 1/1979 | Terry .......................... 166/245 |
| 4,183,405 A | * | 1/1980 | Magnie ....................... 166/260 |
| 4,440,224 A | | 4/1984 | Kreinin et al. |
| 4,444,258 A | * | 4/1984 | Kalmar ....................... 166/261 |
| 5,014,785 A | | 5/1991 | Puri et al. |
| 5,402,847 A | | 4/1995 | Wilson et al. |
| 5,417,286 A | | 5/1995 | Palmer et al. |
| 5,454,666 A | | 10/1995 | Chaback et al. |
| 5,769,165 A | | 6/1998 | Bross et al. |
| 6,290,753 B1 | | 9/2001 | Maeland et al. |
| 6,782,947 B1 | * | 8/2004 | de Rouffignac et al. .... 166/245 |
| 6,880,633 B1 | * | 4/2005 | Wellington et al. ......... 166/245 |
| 6,932,155 B1 | * | 8/2005 | Vinegar et al. ............. 166/245 |

* cited by examiner

*Primary Examiner*—George Suchfield
(74) *Attorney, Agent, or Firm*—William D. Jackson

(57) ABSTRACT

A method for the storage of hydrogen within a subterranean solid carbonaceous formation such as a coal seam. At least one well extends from the surface of the earth into the formation and a pressure gradient extends from the formation to the well to desorb methane within the formation and flow the methane into the well. Subsequent to recovery of the methane from the formation, gaseous hydrogen is injected into the well and into the formation. The injection of hydrogen is carried out under a pressure sufficient to cause the injected hydrogen to become absorbed within the matrix of the carbonaceous formation. Subsequent to storage of the hydrogen, a pressure gradient is established from the formation to the surface to withdraw previously introduced hydrogen to the surface. At least one common well is used for recovery of methane from the formation and introduction of hydrogen into the formation.

20 Claims, 3 Drawing Sheets

SUBTERRANEAN HYDROGEN STORAGE PROCESS

FIELD OF THE INVENTION

This invention relates to a method for the storage of hydrogen in subterranean carbonaceous formations and, more particularly, to the storage of hydrogen in coal beds which have been at least partially depleted of methane.

BACKGROUND OF THE INVENTION

Solid carbonaceous formations such as coal which are found at the subterranean locations in the earth's crust often contain substantial amounts of light hydrocarbons, primarily low molecular weight hydrocarbon gases, principally, methane. In addition to methane, other fluids such as nitrogen, carbon dioxide and small amounts of heavier gaseous hydrocarbons, principally ethane, can be found in the carbonaceous matrix of the coal or other carbonaceous material. Although such gases are found in hydrocarbonaceous shales and other hydrocarbonaceous formations, the principal source of these gases is coal beds. Such gases are generally referred to as "coal bed methane," and although other gases are present as indicated above, they are present in only minor amounts. Typically, coal bed methane will contain at least 90 to 95% volume percent methane and, of course, these gases may take the form of substantially pure methane.

The subterranean coal beds that are often found at depths ranging from 200 to 4,000 feet or deeper and usually include naturally occurring fissures and fractures extending through the solid coal, which provide for the flow of gas within the coal formation. These naturally occurring fractures in coal formations are predominantly vertical fractures which are closely spaced with intervals of perhaps 10 to 100 feet between adjacent fractures. The predominant vertically oriented fractures are referred to as face cleats. Less extensive fractures, which are generally at right angles to the face cleats, are referred to as butt cleats. In some instances, however, fractures present in subterranean coal beds result from fracturing processes such as hydraulic fracturing, employing fracturing fluids and proppants of the type which are well-known in the petroleum industry for the fracturing of subterranean oil reservoirs. Methane in coal beds is found as an absorbed gas in the coal matrix, which is typically in the form of a dense, near-liquid fluid, as contrasted with the free gas found in the gas cap of a petroleum reservoir or dissolved in the liquid petroleum found in petroleum reservoirs. While a small fraction of methane gas may be found in the cleat structure as free gas, a great preponderance of the methane is physically absorbed on the coal structure. The methane is depleted from a coal bed following a desorption isotherm in which the storage capacity of the coal for the methane changes only slightly with reduction in pressure at high pressures, and then changes more rapidly as the pressure in the coal seam is reduced substantially.

Methane is recovered from the subterranean coal bed or other carbonaceous formation by a production system comprising one or more wells extending from the surface of the earth into the subterranean formation. By establishing a pressure gradient from the formation to the well-bore and then to the surface, the methane gas entrained within the coal bed is desorbed and flows through the system of fractures and fissures within the coal bed to the well and is then produced to the surface and transmitted to a suitable methane recovery facility.

SUMMARY OF THE INVENTION

In accordance with the present invention there is provided a method for the storage of hydrogen within a subterranean solid carbonaceous formation. In carrying out the invention, there is provided at least one well extending from the surface of the earth into the solid carbonaceous formation. A pressure gradient extends from the formation to the well to desorb methane within the formation and flow the methane into the well. The methane is produced from the well head and supplied to a suitable surface recovery facility. Subsequent to recovery of the methane from the formation, gaseous hydrogen is injected into the well and into the solid carbonaceous formation. The injection of hydrogen is continued into the subterranean formation under a pressure in an amount sufficient to cause the injected hydrogen to become absorbed within the matrix of the carbonaceous formation. Subsequent to storage of the hydrogen within the formation, a pressure gradient is established from the formation to the surface to withdraw previously introduced hydrogen to the surface.

In a further aspect of the invention, a plurality of wells is extended from the surface of the earth into the subterranean formation. The methane is withdrawn and hydrogen introduced through at least a portion of the wells.

In yet a further aspect of the invention, the subterranean formation is a coal bed. In one embodiment of the invention, the coal bed is depleted to the extent in which at least 75% of the recoverable methane is withdrawn from the formation. In another embodiment of the invention, the coal bed is only partially depleted of methane, wherein the coal bed contains at least 50% of the initial methane within the coal bed.

In a further embodiment of the invention, at least one common well is used for both the recovery of methane from the coal bed formation and the introduction of hydrogen into the coal bed formation. Preferably, hydrogen is introduced into the coal bed in an amount within the range of 0.2–1.0 standard cubic feet of hydrogen for each standard cubic foot of methane recovered from the coal bed formation.

In another aspect of the invention, there are provided a plurality of wells spaced from one another and extending from the surface of the earth into the coal bed. Methane is withdrawn from the wells and hydrogen subsequently introduced into the wells to provide a pattern in which hydrogen is absorbed within the formation in portions of the formation previously depleted of methane.

DETAILED DESCRIPTION OF THE INVENTION

The present invention involves the injection of hydrogen into a subterranean coal bed which has been subjected to a coal gas recovery procedure in which the coal bed has been depleted of methane. Unless otherwise indicated herein, reference to a methane depleted coal bed is intended to include a coal bed which has been partially depleted of methane, that is, a coal bed which retains a substantial portion of commercially recoverable methane, as well as a coal bed which has been depleted of methane to the point in which no further methane is commercially recoverable. It will be understood that the reference to methane gas herein includes coal bed gas when it is substantially pure methane as well as a coal bed gas which contains predominant amounts of methane, typically 90% or more methane, but which also contains other gases such as carbon dioxide and nitrogen, as discussed previously.

Figure 1:
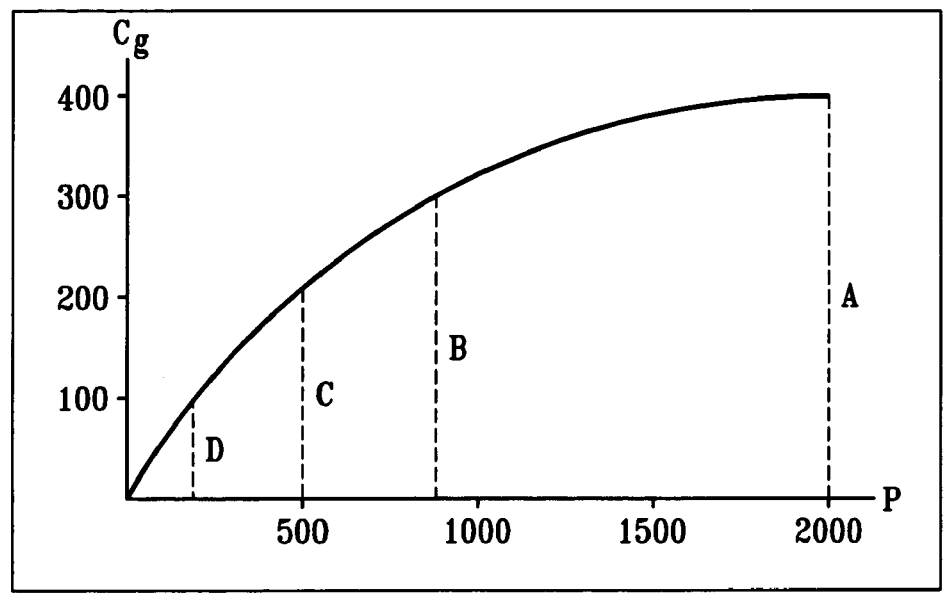
FIG. 1 is an absorption isotherm of a coal bed indicating the relationship between the gas storage capacity of the coal bed for absorption of methane versus pressure.

The invention is carried out in a manner to facilitate the absorption of hydrogen on the coal bed surfaces. The capacity of a subterranean coal bed (or other solid carbonaceous formation) for methane storage can be characterized in terms of its absorption isotherm. FIG. 1 illustrates an absorption isotherm which exemplifies the methane storage capacity of a coal seam at a depth of about 3,000 feet below the earth's surface. In FIG. 1, the curve is a plot of the gas retaining capacity, $C_g$, of a coal seam in standard cubic feet of gas per ton of coal plotted on the ordinate versus pressure, P, on the coal seam in lbs. per square inch plotted on the abscissa. As shown in FIG. 1, the methane retaining capacity of the coal bed initially increases at a relatively rapid rate as the pressure increases, and then increases at a relatively small rate as it approaches an asymptotic value, and in which a further increase in value results in very little increase in gas storage capacity. This asymptotic value typically will be found at a pressure in which the absorption isotherm is at least 95% of the storage capacity at which a further increase in pressure will result in no further increase in storage capacity, i.e., the slope of the curve would be zero. In the depletion isotherm illustrated in FIG. 1, the apparent maximum storage capacity, i.e., the 95% point mentioned previously, is about 400 standard cubic feet of methane per ton of coal, and occurs at a pressure of 2,000 lbs. per square inch, as indicated by broken line A. The point at which the gas storage capacity is decreased by 25% (corresponding to the depletion of methane from the coal seam of 25% of the original value) is indicated by broken line B, and occurs at a pressure of about 800 psi. The midpoint in gas storage capacity, 200 standard cubic feet of methane per ton of coal, is indicated by broken line C and occurs at a pressure of 500 psi, and the 25% level of gas storage capacity, about 100 standard cubic feet per ton of coal, occurs at a pressure of about 200 psi as indicated by broken line, D. As described below, various depletion techniques can be employed in recovering coal gas from the subterranean coal seam. In most cases, the depletion point indicated by broken line A, is at or near a practical minimum value for the recovery of methane from the subterranean coal seam. In this regard, it is. to be recognized that the pressure values shown in FIG. 1 occur at the bottom of the well, that is the face of the formation in the well bore, and some minimum bottom-hole pressure is required in order to facilitate the flow of gas from the bottom of the well to the wellhead. This value will depend upon the depth of the coal seam. As a practical matter, it will usually be desirable to maintain a bottom hole pressure of about 50–200 psi in order to provide for a suitable pressure gradient from the bottom of the well to the surface. In other words, the practical limit on the depletion of methane from the coal seam along the absorption isotherm will be about 50 psi.

Figure 2:
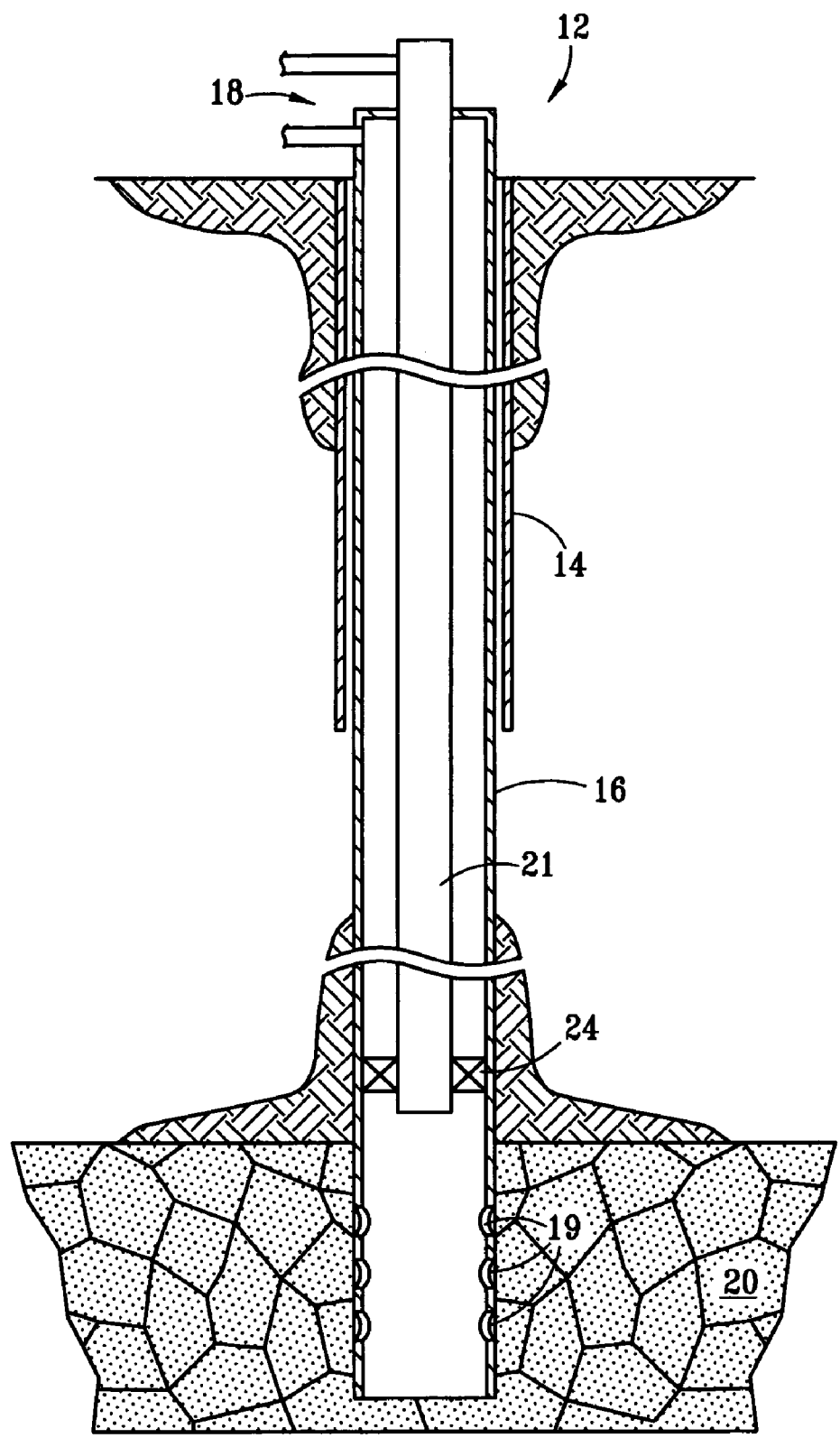
FIG. 2 is a schematic illustration showing a side elevation of a well completed within a coal bed for the withdrawal of methane and the introduction of hydrogen.

As described in greater detail below, it will be preferred in carrying out the invention to produce methane and inject hydrogen through the same well or wells. Any suitable well completion technique can be used in the recovery of methane and the injection of hydrogen into the coal bed. FIG. 2 illustrates a perforated casing technique in which a well 12 is provided with a surface casing string 14, which is set and cemented to a suitable depth, e.g., about 650 feet, followed by a production casing string 16 which extends from the wellhead 18 to a total depth of about 3,300 feet, and then cemented and perforated to provide perforations 19 at an interval, e.g., about 3,150–3,200 feet, in the coal seam 20. A tubing string 21 is run into the well, and a production packer 24 is set at a well depth of about 3,100 feet.

Figure 3:
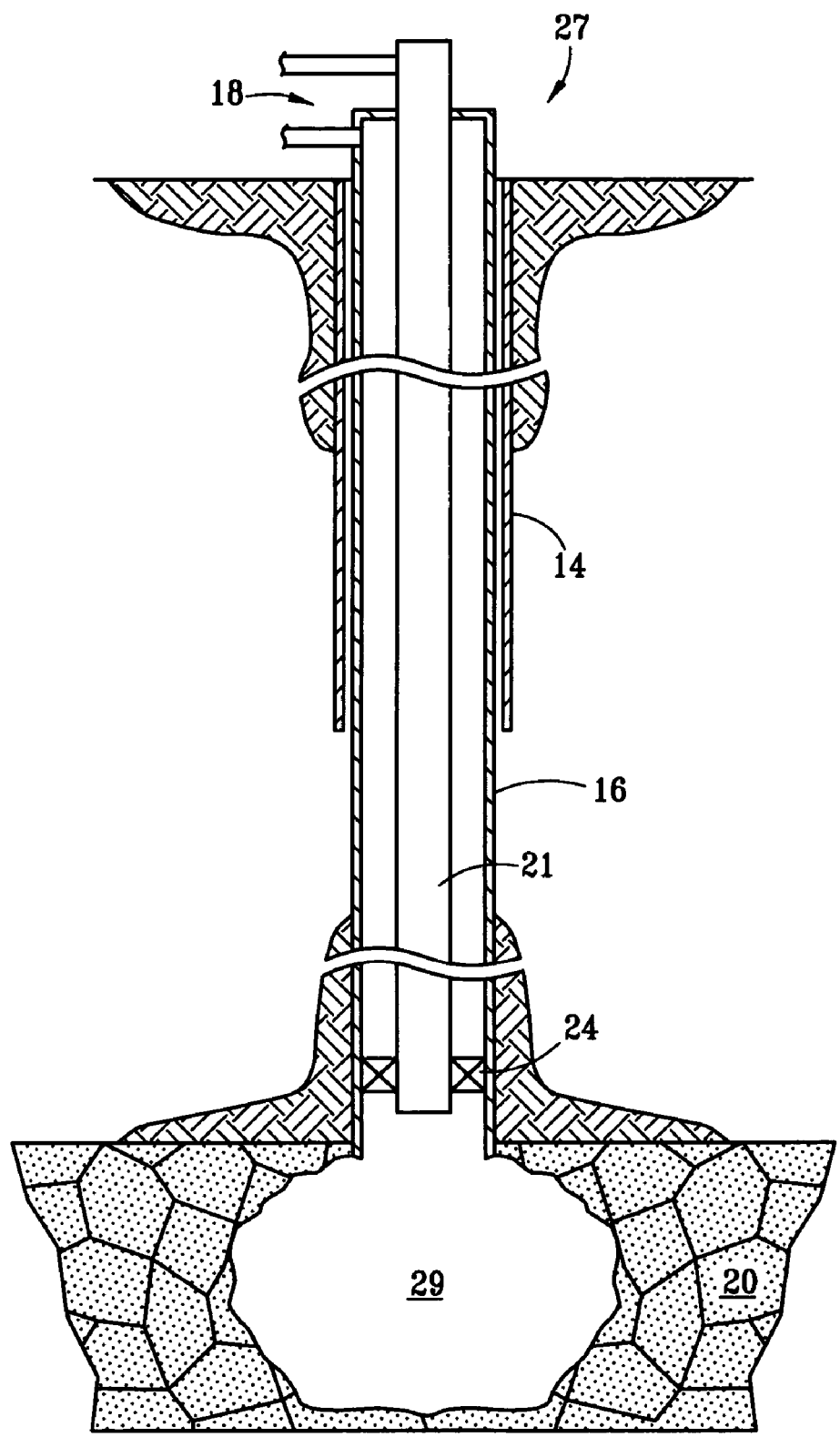
FIG. 3 is a schematic side elevation of an alternative form of well completion.

FIG. 3 illustrates a well 27 completed with an alternative open-hole completion technique in which the production string is run into the top of the coal seam and the well left uncased below the casing shoe. In FIG. 3, like elements are indicated by the same reference numerals as used in FIG. 2. As indicated in FIG. 3, the tubing string and packer are set above the casing shoe, and the well is open below the casing shoe that is exposed to the subterranean coal formation. Preferably, in this type of completion, the portion of the well bore below the casing shoe is enlarged by any suitable technique in order to provide an increased well radius to enhance flow to and from the well into and from the coal seam. By way of example, the open hole portion of the well can be enlarged by cavitation to provide a cavity 29 of enhanced radius within the well bore.

Any suitable arrangement of wells can be employed in recovering methane and introducing hydrogen into the coal bed. Preferably, as noted above, methane production and hydrogen injection is carried out in the same wells in order to take advantage of the maximum methane depletion in the coal seam in the vicinity of a well.

Figure 4:
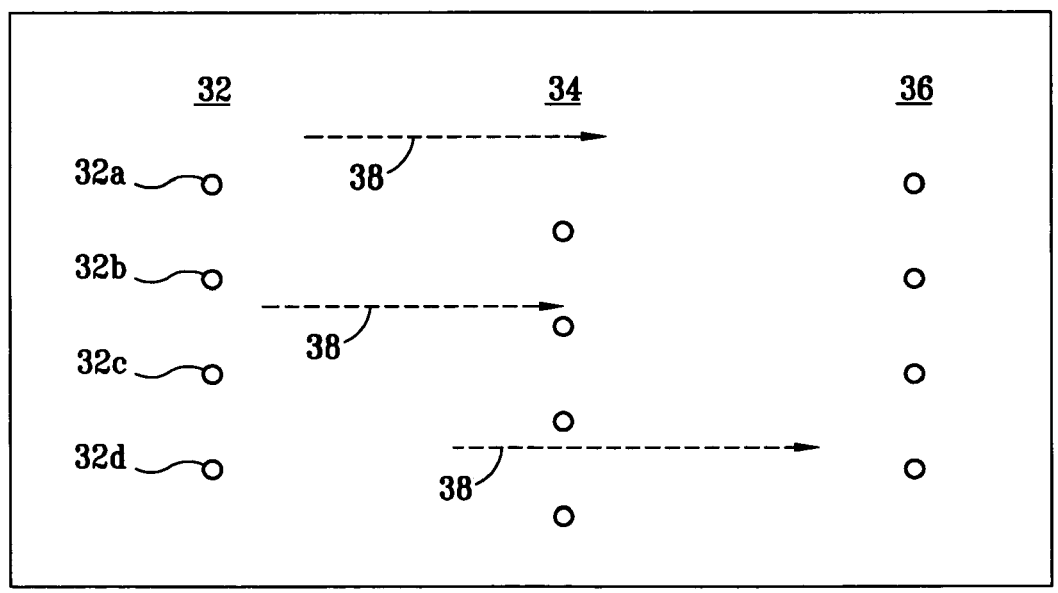
FIG. 4 is an illustration of a well pattern and the relationship of the well pattern to the predominant cleat configuration of a coal seam indicating a suitable well pattern for use in carrying out the invention.

While the invention can be carried out employing a single well or only a few wells, usually in the application of the invention to relatively deep coal seams of a wide aerial extent, a large number of wells will be employed. Depending upon the characteristics of the coal seam and the gross permeability of the coal seam as determined by the cleat structure as well as by any artificially induced fractures, wells may be drilled into the coal seam at a spacing of about one well for each 40–320 acres. The wells preferably are arranged in a relationship in which the preferred fluid flow during hydrogen injection and also during methane depletion is predominantly along the orientation of the face cleats. FIG. 4 illustrates a plan view of a well arrangement comprising a plurality of rows of wells 32, 34 and 36, which extend generally normal to the predominant face cleat orientation, as indicated by broken lines 38. In operation of the well system shown in FIG. 4, the wells in each row of wells are at a relatively close spacing relative to the distance between adjacent rows of wells. Preferably, the spacing between adjacent rows of wells will be at least one to two times the spacing between adjacent wells in a row. More preferably, the ratio of the distance between rows 32 and 34 to the average spacing of wells within an individual row, e.g., wells 32a, 34b, 32c and 32d of row 32 is at least 1:1 to 1:2. In a coal seam having a thickness of perhaps 50–100 feet at a depth of 2,000–4,000 feet, the overall well spacing may be on the order of 40 acres per well. Applying this criteria to the well arrangement shown in FIG. 4, in row 32, the distance between adjacent wells 32a, 32b, 32c and 32d may be 1,320 feet as contrasted with a spacing between row 32 and row 34 of about 1,320–2,640 feet. In this configuration, hydrogen is injected through the wells of rows 32, 34 and 36 at the same time. Hydrogen flow is restrained in the lateral direction along the butt cleats, and forced to flow predominantly in the direction of the face cleats.

As hydrogen is injected into the coal bed, it will exhibit an absorption isotherm of a shape similar to that shown for methane, but with a substantially lower ultimate absorption value. Referring back to the absorption isotherm for methane shown in FIG. 1, and assuming that the coal bed is substantially depleted of methane, the coal seam in question can be expected to store hydrogen by absorption in an amount of less than 200 standard cubic feet per ton at a pressure of 2,000 psi. Additional hydrogen also can be stored in the methane depleted coal seam as free gas. In contrast with the phase conditions originally found in the coal bed in which the coal bed methane is absorbed on the coal surfaces with only a minor amount of methane found as a free gas, a substantially larger amount of hydrogen may be stored in the coal bed in the form of free hydrogen gas. Since as discussed below, the original methane recovery program from the coal preferably will involve the withdrawal of water and other fluids from the coal bed, the capacity of the coal bed to store hydrogen as a free gas will be substantially greater than the storage of hydrogen as an absorbed gas phase. By way of example and referring to the coal bed characteristics as described previously, methane found originally in the coal bed will normally comprise 80–95% absorbed methane with typically 20–5% or less methane as free gas. When the hydrogen storage procedure is implemented, the phase conditions are shifted substantially with perhaps 10–30% hydrogen stored as free gas, and 90–70% hydrogen stored as absorbed on the coal surfaces. The pressure at which the hydrogen is stored within the coal bed formation will depend to some extent upon the depth of the formation with deeper formations accommodating higher pressures. Normally the hydrogen is stored within the subterranean formation at a pressure within the range of 0.1–0.5 psi per foot of depth of the formation. Thus, for a formation having a depth of 3,000 feet below the earth's surface the hydrogen storage pressure may range from 300 to 1,500 psi.

Subterranean coal beds at depths of several thousand feet or more are often found to contain substantial quantities of water. In carrying out the present invention, the production of water from the coal seam not only facilitates the recovery of methane from the coal seam, it also increases the overall porosity of the coal seam to provide for the storage of hydrogen in a free gas phase. Thus, in operation of the coal bed recovery program during the original methane recovery phase, one or more wells penetrating the subterranean coal seam can be equipped with pumping systems in order to withdraw water from the well to the surface of the earth. Suitable pumping systems can take the form of sucker rod pumping systems, which are well-known in the oil industry for the recovery of liquids to the surface of the earth. Other pumping systems such as submersible pumps, progressive cavity pumps, or other systems, depending on the amount of water present, can also be employed. Preferably, in order to facilitate both methane recovery and subsequent hydrogen storage, water is recovered from the coal bed in order to reduce the water content to a value of no more than 20% of the original water saturation.

Recovery of methane from the coal beds can also be facilitated by the injection into the formation of an inert stripping gas such as nitrogen. After water and a significant amount of methane is recovered from the coal bed, an inert gas such as nitrogen is injected into the coal bed formation. The inert gas is not reactive with the methane or with the subsequently injected hydrogen and functions to reduce the methane partial pressure at a given coal bed total pressure to promote methane desorption. This ultimately reduces the methane saturation of the coal bed and increases the capacity of the coal bed for hydrogen storage. Prior to the introduction of the hydrogen, the coal bed is depleted of nitrogen and methane by withdrawing a nitrogen methane mixture. Subsequently, hydrogen is injected into a formation following the procedures discussed previously. Preferably, hydrogen is introduced into the formation through the same wells in which nitrogen is injected and nitrogen and methane withdrawn.

Having described specific embodiments of the present invention, it will be understood that modifications thereof may be suggested to those skilled in the art, and it is intended to cover all such modifications as fall within the scope of the appended claims.

What is claimed:

1. A method for the storage of hydrogen within a solid carbonaceous subterranean formation comprising:
    (a) providing at least one well extending from the surface of the earth and penetrating into said solid carbonaceous formation;
    (b) establishing a pressure gradient from said formation to the surface to desorb methane contained within said solid carbonaceous formation and producing methane from said formation through said well to a surface methane recovery facility;
    (c) subsequent to the recovery of methane from said formation, injecting gaseous hydrogen through said well and into said solid carbonaceous formation;
    (d) continuing the injection of hydrogen into said subterranean formation under a pressure sufficient and in an amount sufficient to cause injected hydrogen to be absorbed within the matrix of said carbonaceous formation; and
    (e) subsequent to the storage of hydrogen within said solid carbonaceous formation establishing a pressure gradient from said carbonaceous formation to the surface to withdraw previously introduced hydrogen to the surface.

2. The method of claim 1 further comprising establishing a plurality of wells extending from the surface of the earth into said subterranean formation and withdrawing methane and introducing hydrogen through at least a portion of said plurality of wells.

3. The method of claim 1 wherein said hydrogen is stored within said subterranean formation at a pressure within the range of 0.1–0.5 psi per foot of depth of said subterranean formation.

4. The method of claim 1 wherein said subterranean formation is a coal bed formation.

5. The method of claim 4 wherein the said coal bed is only partially depleted of methane at the time gaseous hydrogen is introduced into said formation.

6. The method of claim 4 wherein a common well is used for both the recovery of methane from said coal bed formation and the introduction of hydrogen into said coal bed formation.

7. The method of claim 4 wherein the amount of hydrogen introduced into said coal bed formation is within the range of 0.2–1.0 standard cubic feet for each cubic foot of methane recovered from said coal bed formation.

8. The method of claim 4 wherein said coal bed formation is mechanically fractured to produce fissures within said coal bed formation.

9. The method of claim 4 wherein a plurality of wells spaced from one another extend from the surface of the earth into said formation and further comprising, withdrawing methane and introducing hydrogen through said wells to establish a pattern in which hydrogen is absorbed into said formation in portions of said formation previously depleted of methane.

10. The method of claim 4 wherein said coal bed formation is characterized by an orientation of face cleats providing for a predominant direction of flow within said formation and said hydrogen gas is injected into said formation employing a configuration of a plurality of wells in which fluid flow is predominantly along the orientation of said face cleats.

11. The method of claim 4 wherein the recovery of methane from said formation is preceded by the production of water from said formation.

12. The method of claim 11 wherein hydrogen is injected through a plurality of wells from which water has been previously produced.

13. The method of claim 12 wherein water is recovered from said formation in an amount to reduce the water content of the formation at the time of hydrogen injection to a value of 20 volume percent or less of the original water in said formation.

14. The method of claim 10 wherein said plurality of wells are configured in a well pattern comprising rows of wells which are spaced in the direction of the face cleat orientation of said formation, said rows of wells comprising individual rows which are spaced one from another along the butt cleat orientation of the formation, the spacing of said wells being less than the spacing between rows of said wells.

15. The method of claim 14 wherein the ratio of the spacing between the rows of said wells to the average spacing of wells within an individual row is at least 1:1.

16. The method of claim 14 wherein the ratio of the spacing between the rows of said wells to the average spacing of wells within an individual row is at least 2:1.

17. A method for the storage of hydrogen within a solid carbonaceous subterranean formation comprising:
   (a) providing a plurality of wells extending from the surface of the earth and penetrating into said solid carbonaceous formation;
   (b) establishing a pressure gradient from said formation to the surface to desorb methane contained within said solid carbonaceous formation and producing methane from said formation through at least some of said wells to a surface methane recovery facility;
   (c) subsequent to the recovery of methane from said formation, injecting an inert gas through at least some of said wells and into said solid carbonaceous formation to establish a mixture of said inert gas and methane within said formation and reduce the methane partial pressure within said formation;
   (d) withdrawing a mixture of methane and said inert gas from said formation through at least some of said wells;
   (e) subsequent to the recovery of said mixture of methane and said inert gas, injecting gaseous hydrogen into said formation through at least some of said wells and continuing the injection of hydrogen into said subterranean formation under a pressure sufficient and in an amount sufficient to cause injected hydrogen to be absorbed within the matrix of said carbonaceous formation; and
   (f) subsequent to the storage of hydrogen within said solid carbonaceous formation establishing a pressure gradient from said carbonaceous formation to the surface to withdraw previously introduced hydrogen to the surface.

18. The method of claim 17 wherein said subterranean formation is a coal bed formation.

19. The method of claim 18 wherein said inert gas is nitrogen.

20. The method of claim 19 wherein the recovery of methane from said formation is preceded by the production of water from said formation prior to the introduction of said inert gas into said formation.

* * * * *

UNITED STATES PATENT AND TRADEMARK OFFICE
CERTIFICATE OF CORRECTION

PATENT NO. : 7,152,675 B2 Page 1 of 1
APPLICATION NO. : 10/723465
DATED : December 26, 2006
INVENTOR(S) : William C. Heard It is certified that error appears in the above-identified patent and that said Letters Patent is hereby corrected as shown below:

Title page,
Item (73) delete "Assignee: The Curators of the University of Missouri, Columbia, MO (US)"

Column 3, Line 56, delete "is." and insert --is--

Signed and Sealed this

Sixth Day of November, 2007

JON W. DUDAS
*Director of the United States Patent and Trademark Office*